Feb. 8, 1927.
H. HERONIMUS
CORN PLANTER ATTACHMENT
Filed March 15, 1926
1,616,799
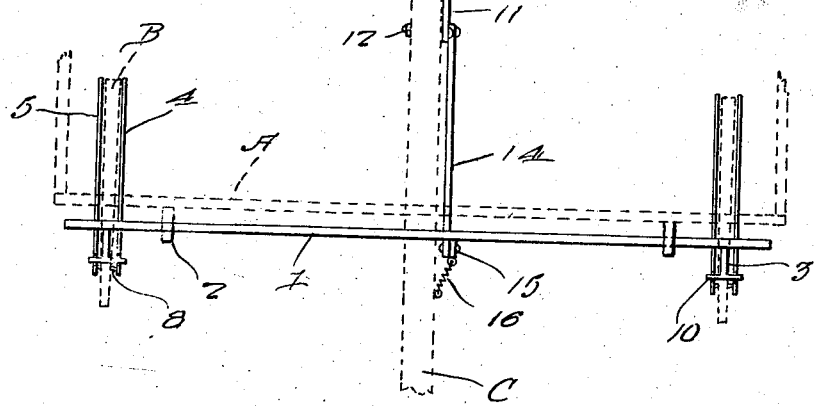
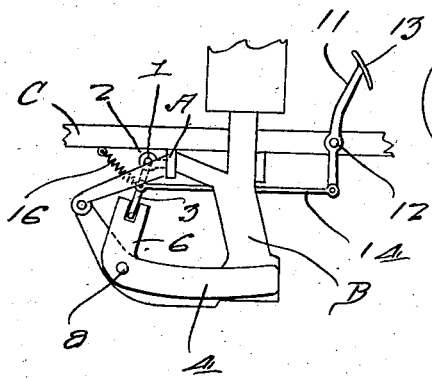
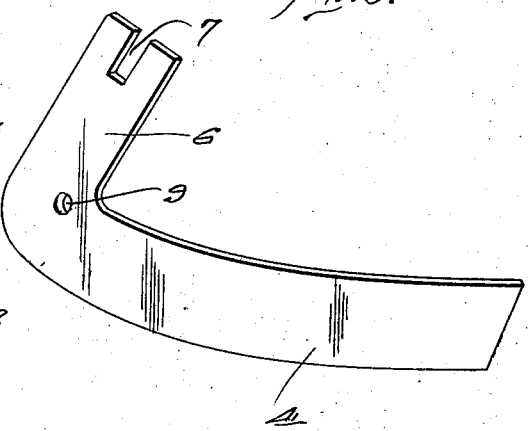
Inventor
H. Heronimus
By Clarence A. O'Brien
Attorney Patented Feb. 8, 1927.

1,616,799

UNITED STATES PATENT OFFICE.

HEYE HERONIMUS, OF HOLLAND, IOWA.

CORN-PLANTER ATTACHMENT.

Application filed March 15, 1926. Serial No. 94,839.

The present invention relates to a corn planter attachment, and has reference more particularly to a means for cleaning the usual shoes of the planter while the implement is in use.

It is a well known fact that the shoes of a corn planter will become clogged with dirt and the like, thus making it difficult for the draft animals to pull the corn planter over the field or soil in which the seeds are being planted, and I have therefore provided a simple and efficient means which may be readily and easily attached to a corn planter for keeping the shoes clean without interfering with the usual operation of the corn planter or the seed dropping mechanism thereof.

A still further object is to provide a corn planter attachment of the above mentioned character which is simple in construction, inexpensive, strong and durable and further well adapted to the purpose for which it is designed.

Other objects and advantages of the invention will become apparent from the following description taken in connection with the accompanying drawing.

In the accompanying drawing forming a part of this application, and in which like numerals designate like parts throughout the several views:

Figure 1 is a top plan view of the atatchment embodying my invention showing the manner in which the same is associated with the shoes, and frame of a corn planter of any conventional construction.

Figure 2 is a side elevation thereof, and

Figure 3 is a detail perspective view of one of the cleaner blades.

In the drawing, wherein for the purpose of illustration is shown the preferred embodiment of my invention, the numeral 1 designates the rock shaft forming a part of the attachment, the same extending transversely across the front of the frame A of a corn planter of any conventional construction, and being supported in suitable bearings such as are shown at 2.

A pair of substantially T-shaped members such as are shown at 3 are rigidly associated with the rocker shaft 1 adjacent the respective ends thereof in the manner clearly illustrated in Figure 1, the purpose of these substantially inverted T-shaped members will be hereinafter more fully described. The shoes of the corn planter are designated at B, and as the same are of the conventional construction, a detailed description thereof is thought unnecessary.

A pair of cleaner members is associated with each of the planter shoes B and the same comprises the blades 4 and 5 respectively. Each of these blades is provided at its forward end with the upwardly disposed portion 6, and furthermore each of the blades is slightly curved as is clearly illustrated in Figures 2 and 3. The upper portion of each of the upwardly disposed ends 6 is cut out as indicated at 7, and the purpose thereof will also be hereinafter more fully described.

Each pair of blades 4 and 5 are adapted to be disposed on opposite sides of each of the corn planter shoes B and a pivot pin 8 extends transversely through the forward portion of each shoe and through registering openings such as are shown at 9, which openings are preferably formed at the juncture of the blade with its upwardly disposed forward end. In this manner, the blades 4 and 5 are pivotally supported on opposite sides of each of the planter shoes B.

The arms 10 of the substantially inverted T-shaped members 3 which extend downwardly from the rocker shaft 1 adjacent the respective ends thereof are adapted to be seated in the registering cut out portions 7 formed in the upper ends of the upwardly disposed portion 6 of each of the blades 4 and 5 so that a positive connection between the blades and the rocker shaft is provided and whereby said blades will be adapted to swing upwardly and downwardly on the pivot 8 for removing the dirt or other foreign substance which clings to the respective side faces of each of the planter shoes B.

The actuating mechanism for operating the rocker shaft 1 and consequently the cleaning members comprises a foot lever 11 which is pivotally supported adjacent its lower end on the tongue C of the corn planter as at 12, a suitable foot pedal 13 being carried by the upper end of the lever. An elongated link or rod 14 is pivotally secured at its rear end to the lower end of the lever 11, the forward end of this link or rod being pivotally connected to a downwardly extending arm 3 which is carried by the intermediate portion of the rocker shaft 1. A coil spring such as is shown at 16 is connected at one end to the lower end of the arm 3 and at its opposite end to the forward portion of the tongue C for normally maintaining the parts in the position shown in Figure 2.

Normally, the blades 4 and 5 are disposed in the manner as shown in Figure 2 in the drawing and will not interfere with the operation of the corn planter or the seed dropping mechanism associated therewith. Should the shoes of the corn planter become clogged up with dirt or other foreign substance so that it is difficult for the draft animals to pull the corn planter, the operator of the corn planter may readily and easily remove the dirt from the shoes by stepping on the foot pedal 13 which will actuate the rocker shaft 11, and simultaneously cause the inverted T-shaped member 3 to cooperate with the cut out portion 7 of the upwardly disposed forward ends of the blades whereby the blades are swung upwardly on their pivots. By raising the foot from the foot lever, the coil spring 16 will return the parts to their normal position. This operation will enable the shoes to be readily and efficiently cleaned so the load or draft is made lighter.

The provision of a corn planter attachment of the above mentioned character enables the same to be readily and easily attached to any conventional type of corn planter without necessitating any material alteration and will furthermore at all times be positive and efficient in carrying out the purposes for which it is designed.

While I have shown the preferred embodiment of the invention it is to be understood that minor changes in the size, shape and arrangement of parts may be resorted to without departing from the spirit of the invention, and the scope of the appended claims.

Having thus described the invention, what I claim as new and desire to secure by Letters Patent is:—

1. An attachment for a corn planter comprising a pair of blades, the forward ends thereof being disposed upwardly, said blades being pivotally secured at the juncture of the blades with the upwardly disposed forward ends thereof on the opposite sides of the corn planter shoe, a rocker shaft supported on the front of the corn planter, means for actuating said rocker shaft, and means carried by the rocker shaft and cooperating with the upwardly disposed forward ends of the cleaner blades for actuating the same to effect the cleaning of the respective sides of the shoe.

2. An attachment for a corn planter comprising a pair of blades, the forward ends thereof being disposed upwardly, said blades being pivotally secured at the juncture of the blades with the upwardly disposed forward ends thereof on the opposite sides of the corn planter shoe, a rocker shaft supported on the front of the corn planter, means for actuating said rocker shaft, means carried by the rocker shaft and cooperating with the upwardly disposed forward ends of the cleaner blades for actuating the same to effect the cleaning of the respective sides of the shoe, and means for returning the movable elements to their normal positions.

3. An attachment for a corn planter comprising a pair of cleaner blades disposed on opposite sides of the corn planter shoe, upwardly disposed extensions formed on the forward ends of the blades, a pivot pin extending transversely through the forward portion of the planter shoe and the adjacent portions of the cleaner blades, a rocker shaft supported on said corn planter, a substantially inverted T-shaped member carried by the rocker shaft, said upwardly disposed portions of said cleaner blades being provided with cut out portions in their upper edges to receive the laterally extending arms of the inverted T-shaped member whereby an operative connection between the rocker shaft and the cleaner blades is provided, and means for actuating the rocker shaft to actuate said cleaner blades for cleaning the respective sides of the shoe.

4. An attachment for a corn planter comprising a pair of cleaner blades disposed on opposite sides of the corn planter shoe, upwardly disposed extensions formed on the forward ends of the blades, a pivot pin extending transversely through the forward portion of the planter shoe and the adjacent portions of the cleaner blades, a rocker shaft supported on said corn planter, a substantially inverted T-shaped member carried by the rocker shaft, said upwardly disposed portions of said cutter blades being provided with cut out portions in their upper edges to receive the laterally extending arms of the inverted T-shaped member whereby an operative connection between the rocker shaft and the cleaner blades is provided, means for actuating the rocker shaft to actuate said cleaner blades for cleaning the respective sides of the shoe, said last mentioned means comprising an arm extending laterally from the rocker shaft, a foot lever pivotally supported on the corn planter, and a rod connecting said foot lever with said arm.

5. An attachment for a corn planter comprising a pair of cleaner blades disposed on opposite sides of the corn planter shoe, upwardly disposed extensions formed on the forward ends of the blades, a pivot pin extending transversely through the forward portion of the planter shoe and the adjacent portions of the cleaner blades, a rocker shaft supported on said corn planter, a substantially inverted T-shaped member carried by the rocker shaft, said upwardly disposed portions of said cutter blades being provided with cut out portions in their upper edges to receive the laterally extending arms of the T-shaped member, means for actuating the rocker shaft to actuate said cleaner blades for cleaning the respective sides of the shoe, said last mentioned means comprising an arm extending laterally from the rocker shaft, a foot lever pivotally supported on the corn planter, a rod connecting said foot lever with said arm, and resilient means for returning the movable elements to their normal positions.

In testimony whereof, I affix my signature.

HEYE HERONIMUS.